(12) United States Patent
Bürger

(10) Patent No.: US 6,178,844 B1
(45) Date of Patent: Jan. 30, 2001

(54) QUICK-ACTION FASTENING SYSTEM FOR ACTUATING-PULL MECHANISMS AND A SPRING FOR A FASTENING SYSTEM

(75) Inventor: Arnd Bürger, Einbeck (DE)

(73) Assignee: United Parts FHS Automobil Systeme GmbH, Dassel (DE)

( * ) Notice: Under 35 U.S.C. 154(b), the term of this patent shall be extended for 0 days.

(21) Appl. No.: 09/232,601

(22) Filed: Jan. 19, 1999

(30) Foreign Application Priority Data

Jan. 16, 1998 (DE) .............................................. 198 01 343

(51) Int. Cl.⁷ ...................................................... F16C 1/10
(52) U.S. Cl. ............................ 74/502.4; 24/541; 24/552; 24/563; 403/327; 403/329
(58) Field of Search ............................. 74/502.4; 24/541, 24/552, 563; 403/326, 327, 329

(56) References Cited

U.S. PATENT DOCUMENTS

| | | | |
|---|---|---|---|
| 3,205,727 | * 9/1965 | Sevrence ........................ | 74/502.4 X |
| 5,347,882 | * 9/1994 | Klotz .................................. | 74/502.4 |
| 5,518,332 | * 5/1996 | Katoh ............................. | 74/502.4 X |
| 5,865,066 | * 2/1999 | Osborn et al. ..................... | 74/502.4 |

FOREIGN PATENT DOCUMENTS 239 984    10/1987  (EP) .

\* cited by examiner

*Primary Examiner*—Allan D. Herrmann
(74) *Attorney, Agent, or Firm*—Cohen, Pontani, Lieberman & Pavane

(57) ABSTRACT

A quick-action fastening system for actuating systems, preferably for motor vehicles, and a spring of the quick-action fastening system. The quick-action fastening system has a spring arranged between a fastening plate and the end part of a cable sheathing. The spring braces the end part directly against the actuating plate and has regions by which it secures the end part on the fastening plate radially and axially and prevents the actuating plate from being withdrawn.

10 Claims, 1 Drawing Sheet

QUICK-ACTION FASTENING SYSTEM FOR ACTUATING-PULL MECHANISMS AND A SPRING FOR A FASTENING SYSTEM

BACKGROUND OF THE INVENTION

1. Field of the Invention

The invention relates to a quick action fastening system for actuating pull mechanisms. The invention further relates to the spring of a quick action fastening system.

The invention can be used wherever actuating pull mechanisms, for example Bowden wires or cable pulls, have to be fastened, with their sheathings, on a housing, or a fastening device on a housing, quickly and reliably and without axial tolerance compensation, while ensuring a long service life.

2. Description of the Related Art

European reference EP 0 239 984 A2 discloses a fastening arrangement for one end of a Bowden wire or cable pull, in particular for cable pull actuating means in motor vehicles. One end of the Bowden wire sheathing is introduced into a retaining nipple that engages in a slot-like receiving opening of a receiving part. Formed integrally on the retaining nipple are latching lugs with latching noses, which interact with latching cutouts in the receiving part. This fastening arrangement can indeed be used to fasten Bowden wires or cable pulls on a housing, but it has the disadvantage that axial tolerance compensation is not possible. The use of plastic nipples to prevent withdrawal results in the problem that the plastic may creep in regions which are subjected to loading, which is the case, in particular, in the case of relatively high housing temperatures. As a result, the connection has a certain amount of play during its service life and this is disadvantageous.

SUMMARY OF THE INVENTION

The object of the present invention is thus to eliminate the disadvantages of the prior art and to provide a solution which allows fixed connection between a fastening plate and the end part of a cable sheathing that, while ensuring a long service life and not being adversely effected by temperature, permits axial tolerance compensation and ensures withdrawal prevention.

Pursuant to this object, and others which will become apparent hereafter, one aspect of the present invention resides in a quick-action fastening system which is intended for actuating-pull mechanisms and can be used preferably for motor vehicles. The fastening mechanism comprises a spring which is arranged between a fastening plate and an end part of a cable sheathing. The fastening plate has a recess in which the end part of the cable sheathing can be positioned. Furthermore, the actuating plate also has, preferably at the top end of the recess, latching means into which the ends of the spring can latch, as a result of which withdrawal prevention is ensured and bracing of the spring takes place at the same time.

The spring is configured so that it braces the end part of the cable sheathing directly against the fastening plate. The precondition for this is that the spring has regions in which it secures the end part on the fastening plate radially and axially and also prevents the withdrawal of the actuating-pull mechanism. The end parts of the cable sheathings usually have a groove for clipping in the fastening plate. The spring is received in a dedicated depression in the end part. This has the advantage over the prior art that the groove which receives the fastening plate is not additionally occupied by the spring as well.

Since the spring thus only has to compensate for the actual accumulative tolerances between the abutment and fastening plate, the connection is more stable than in systems in which the spring is located directly in the groove of the fastening plate. The axial play compensation is realized by the prestressed regions of the spring. In order to allow straightforward fitting and removal of the cable-pull abutment, the quick-action-fastening-system spring according to the invention has an essentially planar circle form over approximately two thirds of its circumference, by means of which the spring encloses the cable-pull sheathing. The circle form has regions which, at least two points or surfaces, act resiliently in the axial direction on the fastening plate.

The spring also has regions which, at at least two points or surfaces, act resiliently in the axial direction on the end part of the cable pull.

In another embodiment of the invention, four regions of the spring act on the fastening plate.

According to the invention, the spring is bent in the axial direction. The ends of the spring, which are bent in the axial direction, are advantageously angled in arcuate form. By means of these bent ends, the spring can be latched into the latching means of the fastening plate, braced and anchored. In still a further embodiment of the invention, the spring is a steel spring.

The spring, which encloses the cable-pull sheathing, may, with the cable-pull sheathing, be introduced or forced into the cutout of the fastening plate, which connects to a shifting mechanism. The ends of the spring, which have eyelets, latch into the latching means of the fastening plate and, in this way, connect the cable-pull sheathing elastically and fixedly in the axial and radial directions to the fastening plate.

The cable-pull sheathing can be released by the ends of the spring being forced together and thus removed from the latching means, whereupon the cable-pull sheathing can be withdrawn from the fastening plate.

The quick-action fastening system according to the invention, which is intended for actuating-pull mechanisms, and the spring have the advantage that, with a small number of parts, actuating-pull mechanisms can be fitted in fastening devices, and removed therefrom, in a straightforward manner. The system can be adapted to different sizes of cable pulls and fastening plates. The prestressing can be adjusted axially and the withdrawal force can be adjusted radially. The spring is not mounted in the groove of the fastening plate, which results in stable mounting. Preliminary orientation is not necessary, to which extent there is a reduction in the outlay required internally for fitting purposes. Furthermore, the elastic spring can carry out tolerance compensation. There is also no elastic deformation, which destroys the spring element upon repeated fitting and removal.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
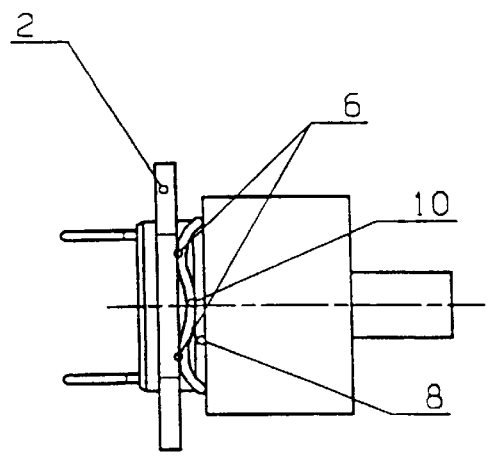
FIG. 1 shows a bottom view of the quick-action fastening system according to the invention.

FIG. 1 shows a bottom view of the quick-action fastening system 1 according to the invention for actuating-pull mechanisms. A wire spring 11 presses on a fastening plate 2 by way of two regions 6. A region 10 serves for supporting the wire spring 11 radially, in order to prevent slippage during the fitting process.

Figure 2:
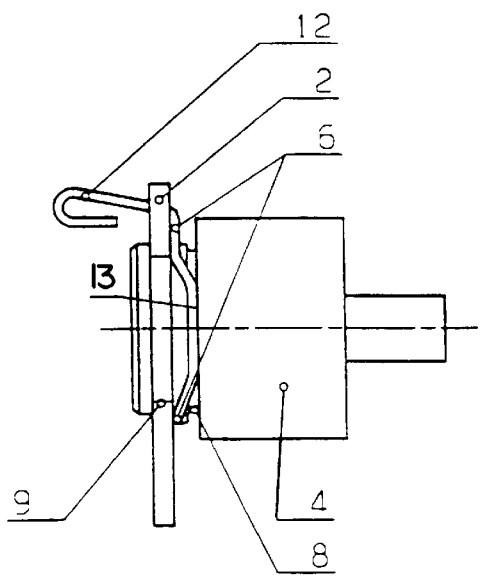
FIG. 2: shows a side view of the quick-action fastening system according to the invention.

FIG. 2 shows the regions 6 which are located above and beneath the center line and act in the axial direction on the actuating plate 2, a region 13 which acts axially on the end part 4 of the cable sheathing being located between the regions 6. The end part of the spring 11 is designed as a bent eyelet 12.

Figure 4:
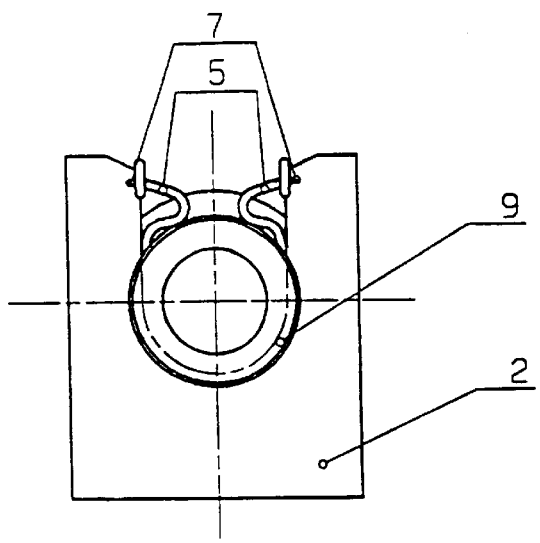
FIG. 4: shows a front view of the quick-action fastening system according to the invention.

As FIG. 4 shows, the bent region 5 of the spring 11 latches into latching means 7 of the fastening plate 2. This radially retains, fixes and braces the actuating-pull mechanism in the fastening plate 2.

Figure 3:
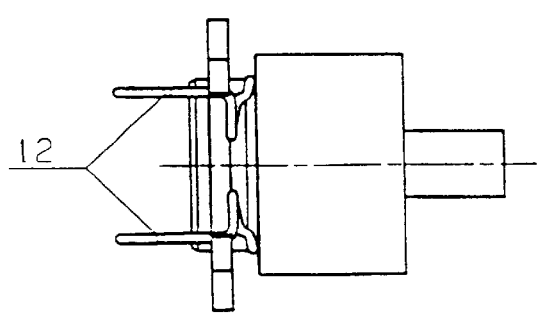
FIG. 3: shows a top view of the quick-action fastening system according to the invention.

This is particularly clear in FIG. 3, which shows the interaction of the spring 11, fastening plate 2 and sheathing of the cable pull as well as the end part 4 of the cable-pull sheathing.

Figure 5:
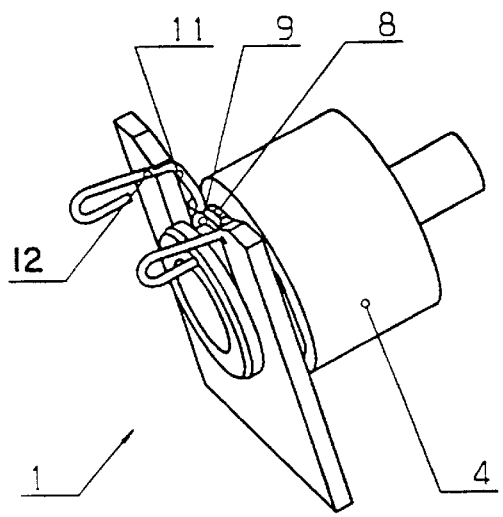
FIG. 5: shows a perspective illustration of the quick-action fastening system according to the invention.

For the purpose of removing the spring 11 and the end part 4 of the cable-pull sheathing, the eyelets 12, in FIG. 5, are forced together and the actuating-pull mechanism, along with the spring 11, is withdrawn.

FIG. 5 shows that the wire spring 11 is received and fixed in a dedicated depression 8 alongside the fastening groove 9 of the end part 4 of the cable sheathing.

The invention is not limited by the embodiments described above which are presented as examples only but can be modified in various ways within the scope of protection defined by the appended patent claims.

I claim:

1. A quick action fastening system for an actuating-pull mechanism, comprising:

a fastening plate; and a wire spring arranged between the fastening plate and an end part of a cable sheathing so that the spring braces the end part directly against the fastening plate, the spring having regions which secure the end part on the fastening plate radially and axially and prevent the actuating-pull mechanism from being withdrawn.

2. A quick-action fastening system as defined in claim 1, wherein the spring is arranged in a depression alongside a fastening groove in the end part.

3. A fastening system as defined in claim 1, wherein the spring has an essentially planar circular form over approximately two thirds of its circumference by which said spring can enclose the cable sheathing, the circular form having at least two regions which configured to act resiliently in an axial direction against the fastening plate, and a region configured to prevent radial slippage during a fitting operation, the spring further having axially bent ends whereby the spring is anchored in the fastening plate.

4. A fastening system as defined in claim 3, wherein there are four of the regions which act resiliently on the fastening plate.

5. A fastening system as defined in claim 3, wherein the spring has ends which are angled in an arcuate form.

6. A fastening system as defined in claim 3, wherein the spring is made of steel.

7. A spring for a fastening system for fastening an end part of a cable sheathing to a fastening plate, the spring comprising a wire defining an essentially planar circular form over approximately two thirds of its circumference by which said spring can enclose the cable sheathing, the circular form having at least two regions which configured to act resiliently in an axial direction against the fastening plate, and a region configured to prevent radial slippage during a fitting operation, the spring further having axially bent ends whereby the spring is anchored in the fastening plate.

8. A fastening system as defined in claim 7, wherein there are four of the regions which act resiliently on the fastening plate.

9. A fastening system as defined in claim 7, wherein the spring has ends which are angled in an arcuate form.

10. A fastening system as defined in claim 7, wherein the spring is made of steel.

* * * * *